(12) United States Patent
Sutcliffe

(10) Patent No.: US 9,497,607 B2
(45) Date of Patent: *Nov. 15, 2016

(54) ALERTS FOR COMMUNICATIONS

(71) Applicant: AT&T Intellectual Property I, L.P., Atlanta, GA (US)

(72) Inventor: Geoff Sutcliffe, Kennesaw, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,242

(22) Filed: Jan. 26, 2015

(65) Prior Publication Data

US 2015/0133095 A1 May 14, 2015

Related U.S. Application Data

(63) Continuation of application No. 13/737,028, filed on Jan. 9, 2013, now Pat. No. 8,972,559, which is a continuation of application No. 10/899,617, filed on Jul. 27, 2004, now Pat. No. 8,375,119.

(51) Int. Cl.

| G06F 15/173 | (2006.01) |
|---|---|
| H04W 4/18 | (2009.01) |
| H04M 1/57 | (2006.01) |
| H04M 3/02 | (2006.01) |
| H04M 19/04 | (2006.01) |
| H04W 4/00 | (2009.01) |
| H04L 12/18 | (2006.01) |
| H04M 3/487 | (2006.01) |
| H04M 3/42 | (2006.01) |

(52) U.S. Cl.
CPC .......... *H04W 4/18* (2013.01); *H04L 12/1895* (2013.01); *H04M 1/57* (2013.01); *H04M 1/576* (2013.01); *H04M 3/02* (2013.01); *H04M 3/4872* (2013.01); *H04M 19/04* (2013.01); *H04W 4/00* (2013.01); *H04M 3/42051* (2013.01)

(58) Field of Classification Search
None
See application file for complete search history.

(56) References Cited

U.S. PATENT DOCUMENTS

| 4,811,382 | A | 3/1989 | Sleevi |
|---|---|---|---|
| 4,850,007 | A | 7/1989 | Marino et al. |
| 5,539,809 | A | 7/1996 | Mayer et al. |
| 5,652,784 | A | 7/1997 | Blen et al. |
| 5,742,905 | A | 4/1998 | Pepe |
| 5,752,191 | A | 5/1998 | Fuller et al. |
| 5,852,657 | A | 12/1998 | Malik |
| 5,926,537 | A | 7/1999 | Birze |
| 6,014,439 | A | 1/2000 | Walker et al. |
| 6,018,577 | A | 1/2000 | Roach |
| 6,038,305 | A | 3/2000 | McAllister |
| 6,085,101 | A | 7/2000 | Jain |
| 6,088,440 | A | 7/2000 | Millar et al. |
| 6,160,489 | A | 12/2000 | Perry et al. |
| 6,330,308 | B1 | 12/2001 | Cheston et al. |

(Continued)

OTHER PUBLICATIONS

John Tagliabue, "Europe Offering Free Calls But First a Word From . . . ", New York Times, Sep. 28, 1997.

*Primary Examiner* — Mohamed Ibrahim
(74) *Attorney, Agent, or Firm* — Scott P. Zimmerman, PLLC

(57) ABSTRACT

Scores, fight songs, and other sports oriented alerts are provided for electronic communications. Different network addresses may be associated with different sports teams. When a communications request is processed, sports scores and video highlights may be played as ringtones to alert of an email, text, or call.

20 Claims, 17 Drawing Sheets

(56) References Cited

U.S. PATENT DOCUMENTS

| | | |
|---|---|---|
| 6,351,639 B1 | 2/2002 | Motohashi |
| 6,366,791 B1 | 4/2002 | Lin |
| 6,385,308 B1 | 5/2002 | Cohen et al. |
| 6,404,880 B1 | 6/2002 | Stevens |
| 6,418,330 B1 | 7/2002 | Lee |
| 6,567,658 B1 | 5/2003 | Van De Graaf |
| 6,574,335 B1 | 6/2003 | Kalmanek |
| 6,577,859 B1 | 6/2003 | Zahavi et al. |
| 6,603,844 B1 | 8/2003 | Chavez et al. |
| 6,606,504 B1 | 8/2003 | Mooney |
| 6,608,891 B1 | 8/2003 | Pelletier et al. |
| 6,665,390 B1 | 12/2003 | Ekstrom |
| 6,694,429 B1 | 2/2004 | Kalmanek |
| 6,778,648 B1 | 8/2004 | Alston |
| 6,807,255 B1 | 10/2004 | Alston |
| 6,816,469 B1 | 11/2004 | Kung et al. |
| 6,829,233 B1 | 12/2004 | Gilboy |
| 6,832,093 B1 | 12/2004 | Ranta |
| 6,856,673 B1 | 2/2005 | Banks et al. |
| 6,950,504 B1 | 9/2005 | Marx et al. |
| 7,088,815 B2 | 8/2006 | MacNamara et al. |
| 7,088,816 B2 | 8/2006 | Donnelly |
| 7,181,417 B1 | 2/2007 | Langseth et al. |
| 7,269,417 B1 | 9/2007 | Bokish |
| 7,305,256 B2 | 12/2007 | Elliot |
| 7,391,314 B2 | 6/2008 | Lemmon |
| 7,602,901 B1 | 10/2009 | Kates et al. |
| 7,985,134 B2 | 7/2011 | Ellis |
| 8,335,824 B2 | 12/2012 | Stephens |
| 2002/0010008 A1* | 1/2002 | Bork et al. ............... 455/567 |
| 2002/0106074 A1 | 8/2002 | Elliott |
| 2002/0107002 A1 | 8/2002 | Duncan et al. |
| 2002/0114437 A1 | 8/2002 | Nabkel et al. |
| 2002/0131574 A1 | 9/2002 | Alleman |
| 2002/0143866 A1 | 10/2002 | Lewis et al. |
| 2002/0187777 A1 | 12/2002 | Osterhout et al. |
| 2002/0194285 A1 | 12/2002 | Mousseau et al. |
| 2002/0194305 A1 | 12/2002 | Sadeghi et al. |
| 2003/0002657 A1 | 1/2003 | Seelig et al. |
| 2003/0054586 A1 | 3/2003 | Shtein et al. |
| 2003/0086558 A1 | 5/2003 | Seelig et al. |
| 2003/0154277 A1 | 8/2003 | Haddad et al. |
| 2003/0208366 A1 | 11/2003 | Goldberg |
| 2004/0028214 A1* | 2/2004 | Laanti ............... H04M 3/428 379/266.06 |
| 2004/0067751 A1 | 4/2004 | Vandermeijden |
| 2004/0102163 A1 | 5/2004 | Seki |
| 2004/0105534 A1 | 6/2004 | Dezonno |
| 2004/0109558 A1 | 6/2004 | Koch |
| 2004/0114732 A1 | 6/2004 | Choe et al. |
| 2004/0120494 A1 | 6/2004 | Jiang et al. |
| 2004/0131048 A1 | 7/2004 | Cook et al. |
| 2004/0174966 A1 | 9/2004 | Koch |
| 2004/0174983 A1 | 9/2004 | Olschwang et al. |
| 2005/0027676 A1* | 2/2005 | Eichstaedt et al. ............ 707/1 |
| 2005/0027742 A1 | 2/2005 | Eichstaedt et al. |
| 2005/0094796 A1 | 5/2005 | Beauford |
| 2005/0105706 A1 | 5/2005 | Kokkinen |
| 2005/0117726 A1 | 6/2005 | DeMent et al. |
| 2005/0143103 A1 | 6/2005 | Bjorgan et al. |
| 2005/0174966 A1 | 8/2005 | Lansford et al. |
| 2005/0259604 A1 | 11/2005 | Salmi |
| 2005/0271186 A1 | 12/2005 | Lichorowic et al. |
| 2006/0095331 A1 | 5/2006 | O'Malley et al. |
| 2006/0143275 A1 | 6/2006 | Stephens et al. |
| 2006/0177044 A1 | 8/2006 | O'Neil et al. |
| 2006/0276179 A1* | 12/2006 | Ghaffari et al. ........... 455/412.2 |
| 2007/0230678 A1 | 10/2007 | Bloebaum et al. |

* cited by examiner

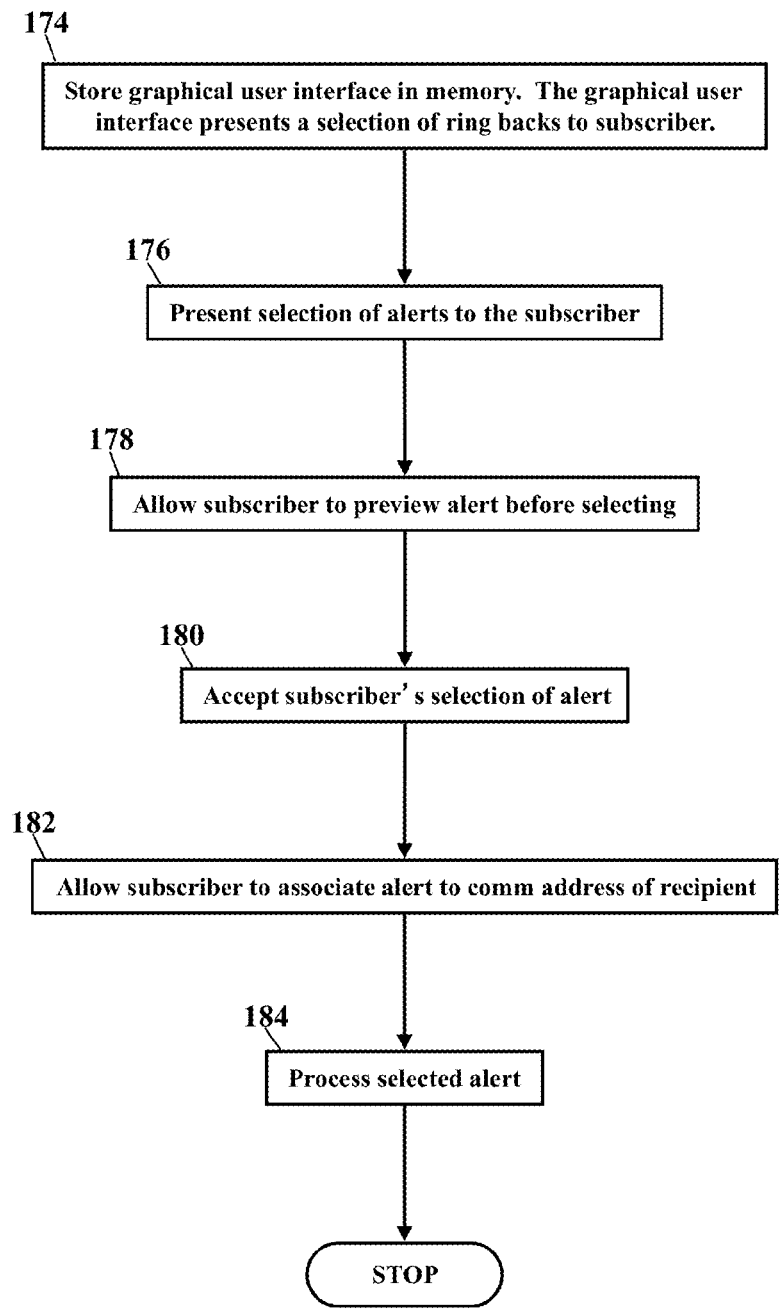

ALERTS FOR COMMUNICATIONS

CROSS-REFERENCE TO RELATED APPLICATIONS

This application is a continuation of U.S. application Ser. No. 13/737,028 filed Jan. 9, 2013 and since issued as U.S. Pat. No. 8,972,559, which is a continuation of U.S. application Ser. No. 10/899,617 filed Jul. 27, 2004 and since issued as U.S. Pat. No. 8,375,119, with both applications incorporated herein by reference in their entireties.

BACKGROUND

1. Field of the Invention

This invention generally relates to methods, systems, devices and products for providing alerts for communications and, more particularly, to enabling a calling party to select an alert that is played at a called party's communications device.

2. Description of the Related Art

Mobile phones, such as cellular phones, have become an integral part of our society. Mobile phones have not only become standard equipment for the employees of many businesses, but have also been widely adopted for personal use. In fact, within a single household, it is likely that more than one family member will possess a mobile phone.

Because of the prevalence of mobile phones in our society, the sound of a mobile phone ringing in a public place is common background noise. Previously, when many mobile phones had the same ring, when one person's mobile phone started to ring many people would check their phones to see if it was their phone that was ringing. Partly because of this problem and also because of people's desire to personalize their phone, mobile phones now allow the user to select a ring tone from a list of ring tones stored in the phone. Recently users can even download songs and other ring tones from their mobile phone service provider or from a third party provider of ring tones to further personalize their phones. Thus, users are no longer limited to the list of ring tones stored in their phone but can select from an almost unlimited number of ring tones. Reference is made to U.S. Pat. No. 6,418,330 to Lee and U.S. Patent Application Publication No. US 2004/0067751 to Vandermeijden et al., which are incorporated herein by reference, both of which describe the ability of a mobile phone user to select a ring tone and to associate ring tones with the calling party. Users desire these personalized features, and these personalized features are profitable for the service provider and for the third party providers of the ring tones.

BRIEF SUMMARY OF THE INVENTION

A method according to an embodiment of the invention provides an alert communications service. This alert communications service can be personalized by a calling party, and this alert communications service provides an additional revenue opportunity for the calling party's or called party's service provider as well as a provider of alerts. This alert communications service allows the calling party of a communication to select the alert played to the called party. The alert can be audio, visual (such as an image or video), tactile, or any such combinations. Thus, the calling party determines whether the called party's communications device rings, plays a song, plays a movie, or displays a picture. The calling party might even select personal pictures, self-composed music, and/or streamed audio and/or video content (such as radio, stock quotes, news, weather, and/or advertisements). The calling party might also specify alerts according to electronic calendar entries, such as by the day of the week, the time of day, and/or appointments in the calendar. The calling party calling may even associate particular alerts to particular called parties, thus providing a variety of personalized alerts.

One advantage of a method according to an embodiment of the invention is that the calling party can select the alert played on called party's communications device. Currently, the called party can associate a particular ring tone to the calling party or select standard ring tone for a mobile phone. The called party may not like the ring tone that the called party selected. A method according to an embodiment of the invention allows the called party to personalize the alert according to the desires of the calling party, not called party. In this manner, the calling party can select an alert that captures the calling party's personality. Additionally, the called party benefits because of receiving entertainment from the calling party selected alerts and also since they can more easily identify the calling party. Rather than the called party needing to associate each calling party with a unique alert, a method according to an embodiment of the invention allows the calling party to make this selection.

This alert communications service also provides a revenue opportunity for service providers. The calling party may be charged a monthly fee for this alert service. The calling party may additionally or alternatively be charged a nominal fee per each personalized alert. The service provider could also realize revenue by providing a selection of alerts to the calling party and/or the general public, and more revenue could be realized from a nominal fee for each downloaded alert. The service provider may also charge a fee for enabling the alert service. The called party, too, may be charged a fee for receiving/processing the personalized alert, such as a monthly fee or usage fee.

One method according to an embodiment of the invention processes a communication request initiated by the calling party and terminating at the called party's communications device. An alert accompanying the communication request is also processed. The alert is selected by the calling party for being played on the called party's communications device, and the alert announces the incoming communication request. This method thus allows the calling party to specify the alert to be played on the called party's communications device.

Another of the embodiments is directed to a method of providing an alert for the called party's communications device. A communication request initiated by the calling party is forwarded for termination at the called party's communications device. An alert is also received and accompanies the communication request. The alert is selected by the calling party for presentation on the called party's communications device, and the alert announces the incoming communication request.

Another of the embodiments is directed to a method of receiving an alert at a communications device. Here the alert is received via a communications network. The alert accompanies an incoming communication request, and the alert is selected by the calling party for being played on the communications device. The alert announces the incoming communication request and is played on the communications device. The calling party may thus specify the alert to be played on the called party's communications device.

Yet another of the embodiments is directed to a method of providing a communications service to a calling party. The calling party is provided a selection of alerts. One or more of the alerts accompany a communication from the calling party, and the alert(s) is/are for announcing the incoming communication request at the called party's communications device. The calling party may preview the alert before selecting. That is, the calling party may hear, see, and/or feel the previewed alert. The calling party may even smell and/or touch the alert, if those features are available. The selection of alerts may be presented using a graphical user interface (GUI) stored in memory. The calling party's selection of an alert is accepted, thus allowing the calling party to specify the alert to be presented on the called party's communications device.

Yet another embodiment of the invention is directed to a system for providing an alert. This system includes an alert module stored in a memory device, and a processor communicates with the memory device. The alert module provides a selection of alerts to the calling party, and the alert module accepts the calling party's selection of an alert. The alert accompanies a communication request from the calling party, and the alert is for announcing the incoming communication request to the called party.

Other systems, methods, devices, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein:

FIG. 18 is a flowchart illustrating a method of providing an alert communications service to a calling party.

DETAILED DESCRIPTION OF THE INVENTION

Figure 1:
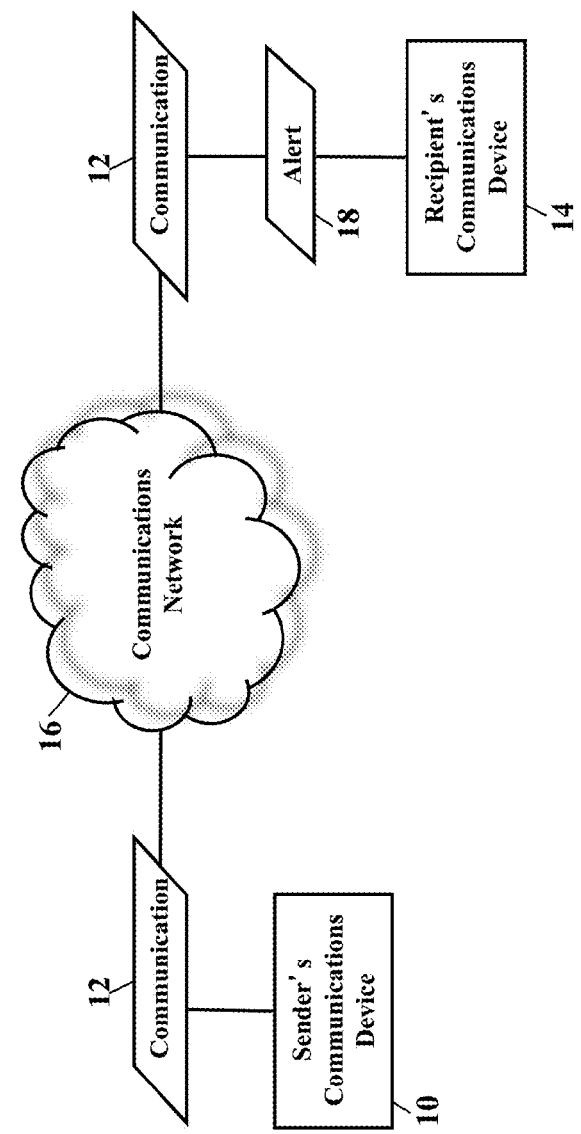
FIG. 1 is a simplified schematic illustrating a network for providing an alert communications service, according to the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Methods, systems, devices, computer programs, and computer program products according to embodiments of the invention provide an alert communications service. This alert communications service can be personalized by a calling party, and this alert communications service provides an additional revenue opportunity for the service provider. This alert communications service allows the calling party to select the alert announced to the called party. The alert is played during a wait time occurring after a communication request is received at the called party's communications device and before the calling party's communications device receives a resolution of the communication request. The communication request can be resolved by the called party accepting the communication request, such as by lifting the handset if the called party's communication device is a telephone. Other resolutions include rejecting the request, such as by returning a busy signal, or re-directing the communication request to voice mail or to another called party's communication device. The alert can be audio, visual (such as images or video), and/or tactile feedback delivered to the called party. For instance, the calling party determines whether the called party's communications device rings, plays a song, plays a movie, or displays a picture. The calling party might even select personal pictures, self-composed music, and/or streamed audio and/or video content (such as radio, stock quotes, news, weather, and/or advertisements). The calling party might also specify alerts according to electronic calendar entries, such as by the day of the week, the time of day, and/or appointments in the calendar. The calling party may even associate particular alerts to particular called parties, thus providing a variety of personalized alerts.

FIG. 1 is a simplified schematic of a network providing an alert communications service. The calling party, using a calling party's communications device 10, initiates a communication request 12 to a called party's communications device 14. The communication request 12 may be any form of electronic communication, such as an email, a page, a facsimile, a Plain Old Telephone System telephone call, and/or an Internet Protocol telephone call. Furthermore, as described in more detail below with reference to FIGS. 9 and 10, the devices 10 and 14 may be any type of communications device. The communication request 12 is routed from the calling party's communications device 10 to the called party's communications device 14 via a communications network 16. Communications equipment (such as computer servers, switches, and other computer systems that will be later explained) operate within the communications network 16 and process the communication request 12. This communications equipment also processes an alert 18. This alert 18 accompanies the communication request 12, and the alert 18 is selected by the calling party for being played on the called party's communications device 14. The alert 18 may be ring tones, graphics, audio, or other alert (as further explained) that announces the incoming communication request 12.

This network allows the calling party to specify the alert 18. That is, the calling party of the communication request 12 selects what alert that is played on the called party's communications device 14. When the called party sees/hears the alert 18, that alert 18 is personalized by the-calling party. The alert 18 may be any music, tone(s), and/or graphics selected by the calling party. As one example, the alert to be played at the called party's communications device 14 may be the same tone, images, etc. that the calling party has playing as a ring back on the calling party's communications device 10 or the same alert that the calling party has selected for incoming communication requests. The calling party, for example, may select an .mp3 file to announce the incoming communication request 12. The calling party may want their incoming communication request 12 announced by The Who's "My Generation," Beethoven's "Für Elise," or any other music selected by the calling party. The calling party might also prefer a picture, portions of a movie, or other graphics. The calling party might even specify streamed audio and/or video content, such as radio, stock quotes, news, weather, and/or advertisements. The calling party could also use logical rules for specifying the alert 18. These logical rules might specify alerts by the month, the day of the week, and/or the time of day. As this patent will further explain, the calling party may even associate particular alerts to particular called parties, thus providing a variety of personalized alerts.

As mentioned above, the calling party can select the alert. The calling party is intended to encompass more than just the individual user or owner of the calling party's communications device 10 who can select or control the alert. For instance, the calling party may comprise an employer or other organization or entity that is associated with a group of communications devices. The Coca-Cola Company of Atlanta, Ga., for instance, may designate their latest corporate jingle as the alert to be played whenever someone makes a call on a company phone. Further, as described in more detail below, the calling party may select the alert by accepting a selection or group of alerts offered by a provider of alerts or the communications service provider.

The network 16 may comprise any type of network and may actually comprise a plurality of interconnected networks. These networks include, but are not limited to, Public Switched Telephone Network (PSTN), the Internet, intranet, Public Branch Exchange (PBX), wireless network, satellite network, cable network, power network, and/or a home network. As will become more apparent from the description below, an alert service according to an embodiment of the invention allows a mobile phone called party to receive an alert specified by the calling party. As another example, a POTS called party, a called party using a cable network, and a called party using Voice over Internet Protocol (VoIP) may also receive alerts specified by the respective calling parties.

U.S. Pat. No. 6,351,639 to Motohashi, which is incorporated herein by reference, describes a system that allows a limited ability for the settings of a called telephone to be changed. As discussed in the Background section of this patent, a remote control technique exists for testing terminals that allows the calling party to change the volume of ring or degree of vibration at the called party's telephone. This technique can be inconvenient for the called party and may introduce some confusion. Motohashi describes how the called party's phone within this testing environment can accept or unconditionally refuse a request by the calling telephone to change the ring volume or call vibrator (see, e.g., column 2, lines 30-35). Motohashi, however, does not disclose how the specific alert that is played to the called party can be selected by the calling party—only that in the one particular testing environment how the volume of the ring or the activation of the vibrator can be controlled.

Figure 2:
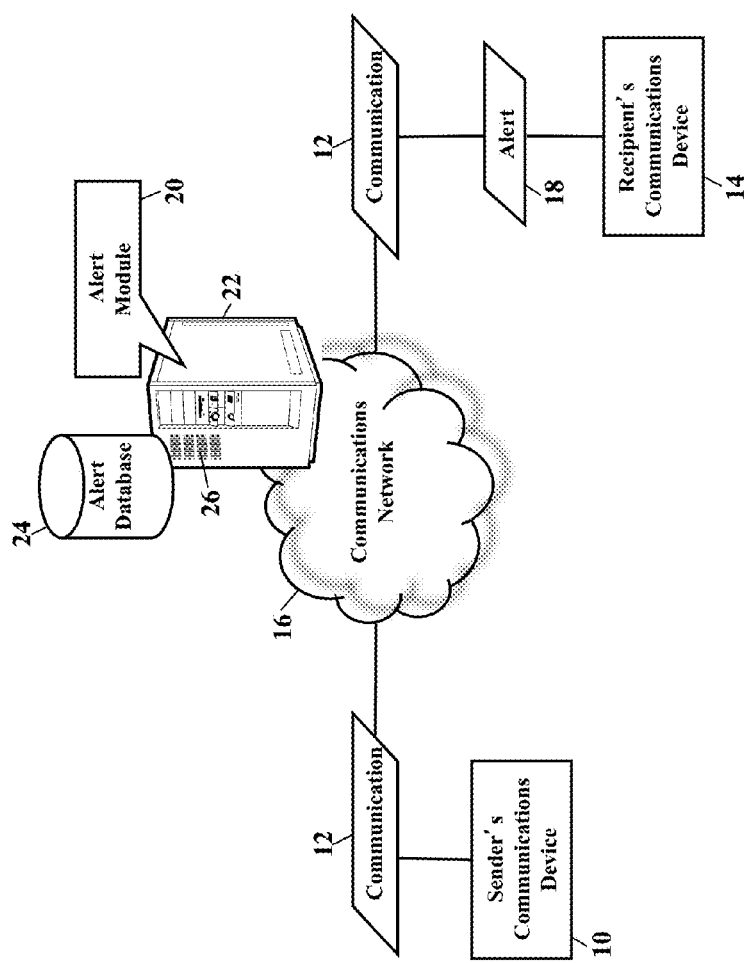
FIGS. 2-4 are more detailed schematics of networks providing this alert communications service, according to the embodiments of this invention.
Figure 3:
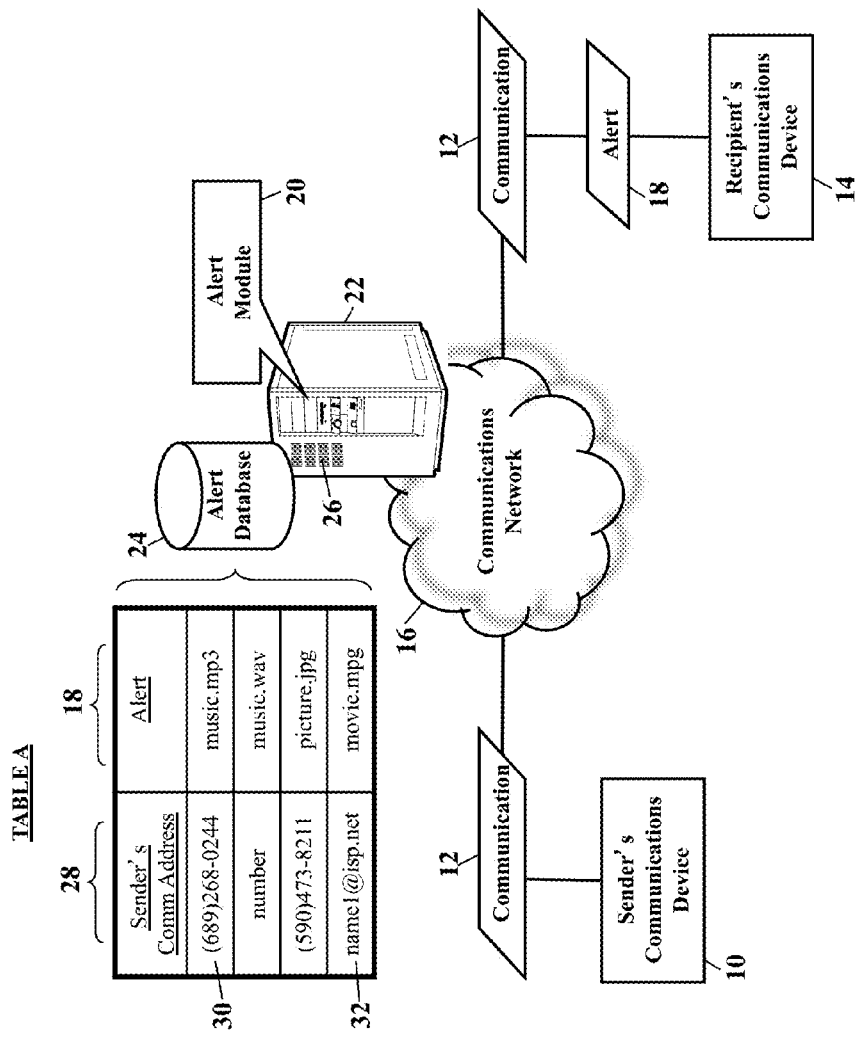
Figure 4:
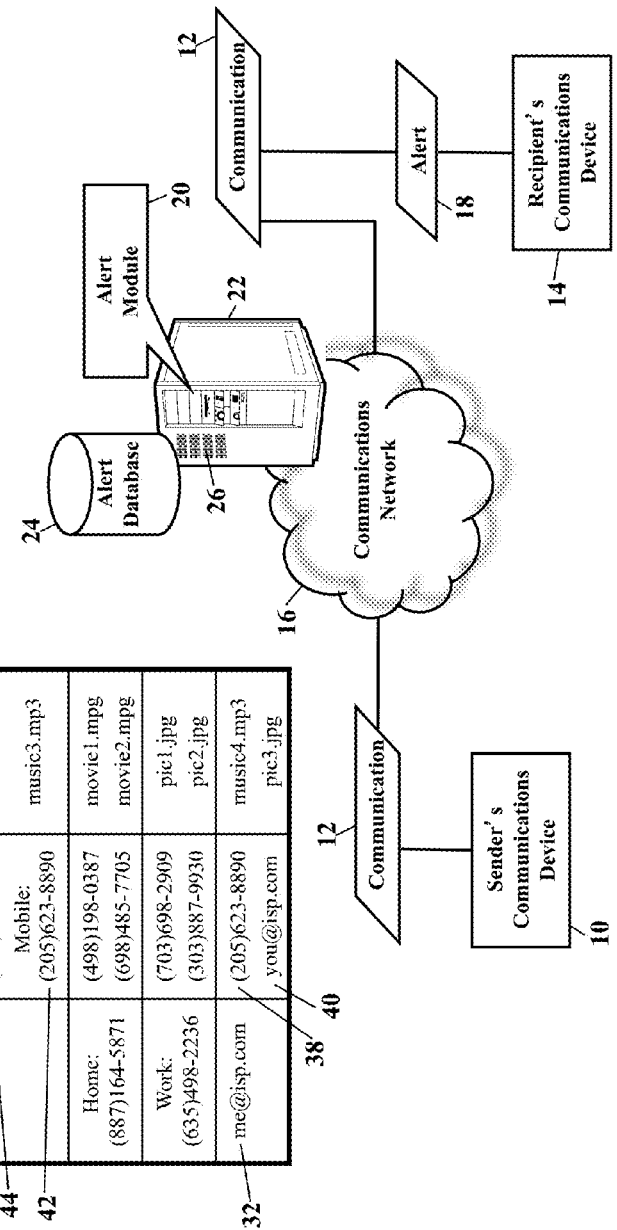

FIGS. 2-4 are detailed schematics of networks providing this alert communications service. This alert communications service allows the calling party to specify the alert 18. The calling party of the communication request 12 selects what alert that is played on the called party's communications device 14. As FIG. 2 shows, an alert module 20 manages the alert communications service for the-calling party. The alert module 20 comprises methods, systems, computer programs, and/or computer program products that process the alert 18 played on the called party's communications device 14. The alert module 20 operates within any computer system, such as a communications server 22. The communications server 22 operates at any location within the communications network 16. As the communication request 12 is communicated to the called party's communications device 14, the alert module 20 determines whether the personalized alert 18 is required. If the personalized alert 18 is required, the alert module 20 queries an alert database 24 stored in a memory 26 of the communications server 22. The alert 18 is retrieved and communicated to the called party's communications device 10. The alert 18 plays music, a movie clip, presents a picture, or otherwise alerts the called party to the incoming communication request 12.

FIG. 3 illustrates an association for this alert communications service. As the communication request 12 is processed, the alert module 20 queries the alert database 24 for the calling party. If the calling party is located in the alert database 24, then the alert database 24 also communicates the personalized alert 18 associated with the calling party. As Table A shows, the alert database 24 stores a list of calling parties to this alert communications service. The alert database 24 may identify/locate a calling party according to name, physical address, social security number, and/or some other identifying information. The alert database 24, however, typically identifies a calling party according to a communications address 28. The communications address 28 may be a telephone number 30 and/or an email address 32. If either the calling party's telephone number 30 or email address 32 is found in the alert database 24, then the alert database 24 communicates the personalized alert 18 associated with the calling party.

FIG. 4 illustrates another association for this alert communications service. The association shown in FIG. 3 retrieves one personalized alert 18 per communications address 28. In other embodiments of this invention, however, the calling party may be able to associate particular alerts to particular called parties, thus providing a variety of personalized alerts. Each calling party could have a profile 34. Logically grouped within this profile 34 would be various calling party-defined alert associations 36. The calling party could access their profile 34 via an interactive voice response system, a graphical user interface and the Internet, or any other selection method. Furthermore, the calling party may create associations directly through the calling party's communications device 10 and the associations may be stored in local memory. The associations may be stored anywhere on the network 16 and, if created locally by the device 10, the device 10 may transmit those associations for remote storage, such as through an SMS message. As Table B shows, the calling party associates the called party to the alert 18. That is, the calling party can enter the calling party's communications address 28, the called party's telephone number 38, and the associated alert 18. The calling party, of course, could also associate the calling party's email address 32 or an Internet Protocol address, the called party's telephone number 38, and the associated alert 18. The calling party may even associate the called party's email address 40 or Internet Protocol address to the alert 18. Whether the called party utilizes the telephone number 38 or the email address 40, the calling party may associate a personalized alert for the called party. The calling party may even identify the called party according to name, physical address, account number(s), social security number, and/or some other identifying information. However the calling party defines their profile 34, the alert database 24 retrieves and return communicates the personalized alert 18 associated with the called party.

FIG. 4 also illustrates associations for multiple called party communications addresses 41. The called party may have a mobile telephone number 42, a home telephone number 44, and an office telephone number 46. The calling party may choose to associate different alerts 18, depending on the called party's communications addresses 41. A call to the called party's mobile telephone number 42 may present a music file alert, while a call to the called party's office telephone number 46 may receive a more subdued alert. However the calling party defines their profile 34, the alert database 24 communicates the personalized alert 18 associated with the calling party's communications address 28 and the called party's communications addresses 41.

The calling party may further associate personalized alerts. The calling party, as explained above, may choose to associate different alerts 18, depending on the called party's communications addresses 41. FIG. 4 also demonstrates, however, that the calling party may associate alerts depending upon the calling party's communications address 28. The calling party may associate different alerts, depending upon the calling party's mobile phone, home phone, work phone, email address, pager address, and any other communications address. A call routing from the calling party's mobile phone to the called party's mobile telephone number 42 may present a first alert, while a call from the calling party's mobile phone to the called party's home telephone number 44 may present a second alert. The calling party may continue associating different alerts to the calling party's home phone, work phone, email addresses pager addresses, and other communications addresses. The profile 34 thus allows the calling party to completely personalize the alert 18, depending on the calling party's communications address and the called party's communications address.

FIGS. 3 and 4 are examples of ways in which the calling party may associate alerts 18 to called parties. In general, the calling party may select an alert 18 based on any one or any combination of the called party's communication device 14, the calling party's communication device 10, the network 16, or the time of day. For instance, the alerts may vary depending upon whether the called party's communication device 14 is capable of displaying images or video or whether the device 14 can provide tactile feedback. Another factor that can be considered when selecting an alert 18 includes the status of the called party's communications device 14, such as whether the device 14 is currently in use or busy, is available for handling a communication, is turned on or off, or some other status of the communications device 14. As further example, alerts can be selected based on the type of called party, whereby a company can receive a drastically different alert than a family member.

As another example, the alerts 18 can be tied to another source of data, such as third party data available through the network 16. For instance, the calling party can instruct the alert module 20 to tie the alerts to current weather conditions for the calling party. With this example, the alert module 20 would query a third party source of weather data to retrieve local weather conditions, perform a look up in the calling party's profile to determine which alert to select, and then communicate the appropriate alert to the called party. Thus, the called party can receive "Let it Snow" when it is snowing, "Rain Drops Keep Falling on My Head" when it is raining, or a song from Roger Hurricane Wilson if a hurricane is approaching. Instead of weather data, the third party data may be financial data, such as whether a stock price is up or down during a day, or sports data, such as whether the local football team won its game the prior weekend. As apparent from the examples above, this third party data may be received in real-time or, alternatively, may be received only at certain times.

Instead of the calling party selecting the alert, the calling party may opt for a default alert or program of alerts. Thus, rather than trying to select appropriate alerts for weather conditions, a provider of the alert service can formulate a weather program of alerts that the calling party can select. The calling party may also opt for a random selection of alerts or perhaps a selection of alerts within a certain genre, such as songs from The Who or video clips from Clint Eastwood westerns. As another example, the alerts provider may provide seasonal alerts that are tied to holidays or may provide an alert program tied to a region, such as one for Atlanta, Ga. and another one for Chagrin Falls, Ohio.

Figure 5:
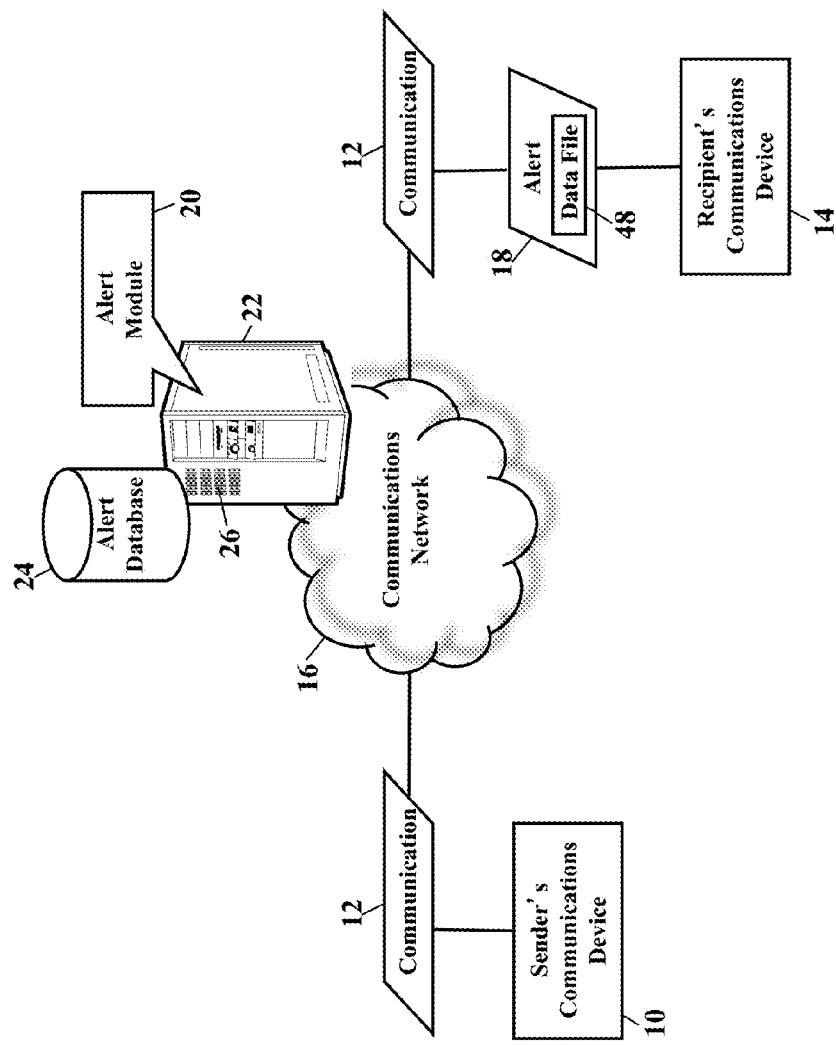
FIGS. 5 and 6 are schematics of networks providing this alert communications service, according to the embodiments of this invention.
Figure 6:
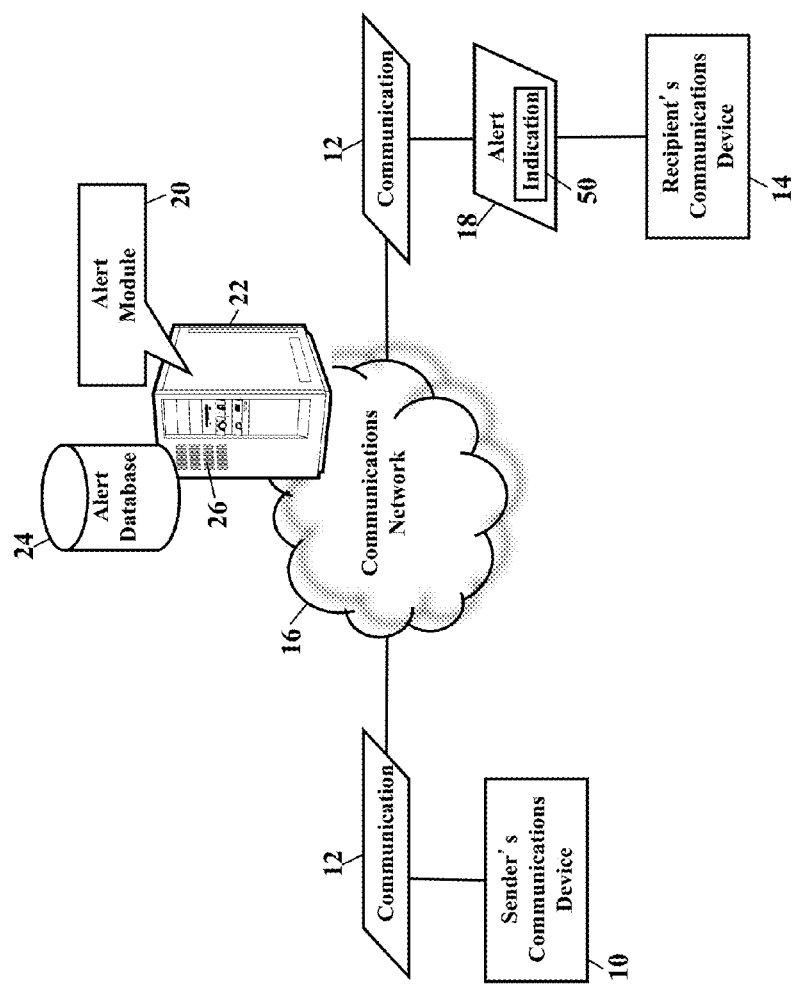

FIGS. 5 and 6 are schematics further illustrating networks that provide this alert communications service. Here the alert 18 may be a data file 48 and/or an indication 50 of the alert. As the communication request 12 is processed for delivery to the called party's communications device 14, the alert module 20 queries the alert database 24. If the personalized alert 18 is required, the alert database 24 retrieves and return communicates the personalized alert 18. The alert 18 is then played on the called party's communications device 14. In the example of FIG. 5, the alert module 20 actually delivers the alert or causes the alert to be delivered, such as through an alert provider, to the called party. In the example of FIG. 6, the alert is not actually delivered but the alert module 20 provides the indication 50 from which the called party's communications device 14 can retrieve the alert. This indication 50 may be an identification of the alert, such as by name or memory pointer, or a command instructing the called party's communication device 14 to retrieve the alert.

As FIG. 5 shows, the alert 18 may comprise the data file 48. When the alert database 24 retrieves and return communicates the personalized alert 18, the alert 18 may include the data file 48. That is, the data file 48 is "pushed" to the called party's communications device 14. The data file 48 comprises the personalized alert 18 that plays on the called party's communications device 14. When the data file 48 arrives at the called party's communications device 14, the called party's communications device 14 reads the data file 48. The data file 48 could contain any music, tone(s), movie(s), and/or graphics selected by the calling party.

As FIG. 6 shows, the alert 18 may comprise the indication 50. When the alert database 24 communicates the personalized alert 18, the alert 18 may include the indication 50. The indication 50 indicates what alert should be retrieved from memory and presented on the called party's communications device 14. When the indication 50 is received by the called party's communications device 14, the indication 50 instructs the called party's communications device 14 to locally retrieve the appropriate alert 18. The indication 50 may be a filename, a memory pointer, and/or instructions for presenting the alert 18. When the called party's communications device 14 receives the indication 50, the called party's communications device 14 locally retrieves and presents the appropriate alert. The calling party may thus specify the alert to be played on the recipient's communications device 14, and the alert announces the incoming communication request 12. The indication 50 may include a command for the called party's communications device 14 with instructions on how to obtain the alert, such as locally on the device 14 itself or from a remote location. If the alerts are stored locally within the device 14, the called party may exert some control or censorship over the types of alerts that may be presented on the device 14. If the alert is not present in the device 14, then the device 14 would revert to the standard alert or an alert selected by the called party. Instead of retrieving the alert from local memory, the indication 50 may be a pointer to a remote memory or a command on how to retrieve the alert.

Figure 7:
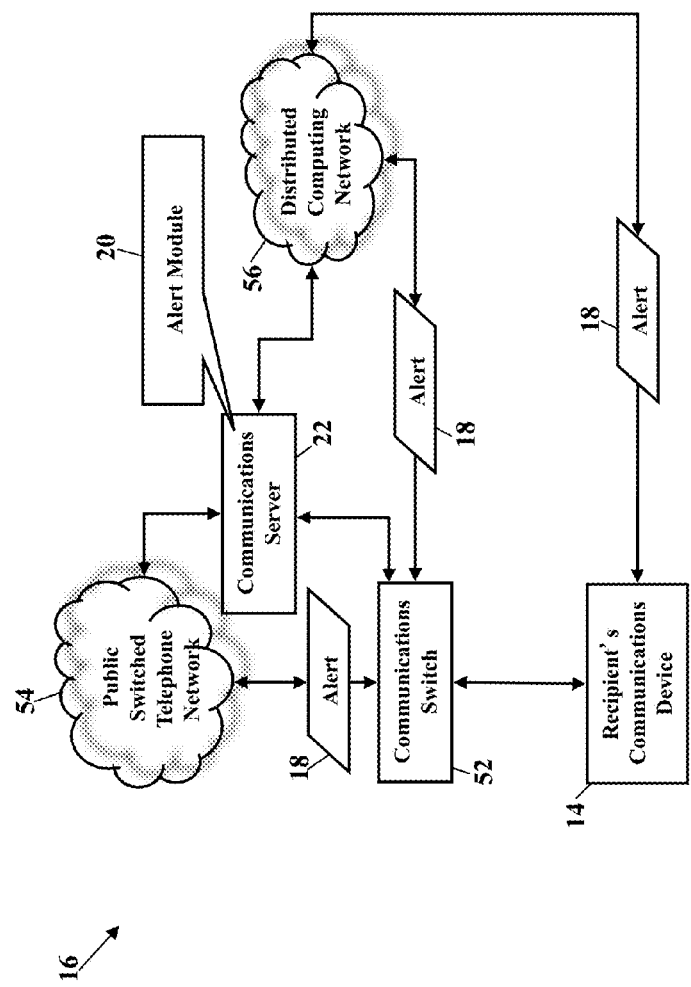
FIG. 7 illustrates an operating environment for embodiments of this invention.

FIG. 7 illustrates an operating environment for embodiments of this invention. FIG. 7 is a schematic showing the alert module 20 operating within the communications network 16. The alert module 20 operates within the communications server 22, and the communications server 22 interfaces with a Public Switched Telephone Network 54 and with a distributed computing network 56. The communications network 16 also includes a communications switch 52 interfacing with the communications server 22, with the Public Switched Telephone Network 54, and with the distributed computing network 56. The communications server 22 interfaces with the communications switch 52 via a packet protocol, such as Session Initiation Protocol (SIP). The communications server 22 may include voice service protocols, triggers, and/or operations that allow the Public Switched Telephone Network 54 and the distributed computing network 56 to interoperate. The communications server 22 may be a packet-based "softswitch" that uses software control to provide voice, data, and video services by dynamically changing its connection data rates and protocols types. The communications switch 22 may alternatively or additionally include Advanced Intelligent Network (AIN) components controlling many features of the communications switch 22. In the AIN environment, signaling is initiated from the calling party's switch to the called party's switch and a trigger at the called party's switch causes a query that is ultimately routed to the alert module 20. The alert module 20 ensures that the alert is being played at the called party's communications device 14. The alert module 20 may deliver the alert along with a command to play the alert. The communication device 14 may be alert-capable and be programmed such that it plays the alert until the device 14 detects activity, such as the called party answering the phone. In a wireless network, the called party may have a flag in their Home Location Register (HLR) which initiates the signaling to the ring back module 20. For a general description of conventional call routing, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

Figure 8:
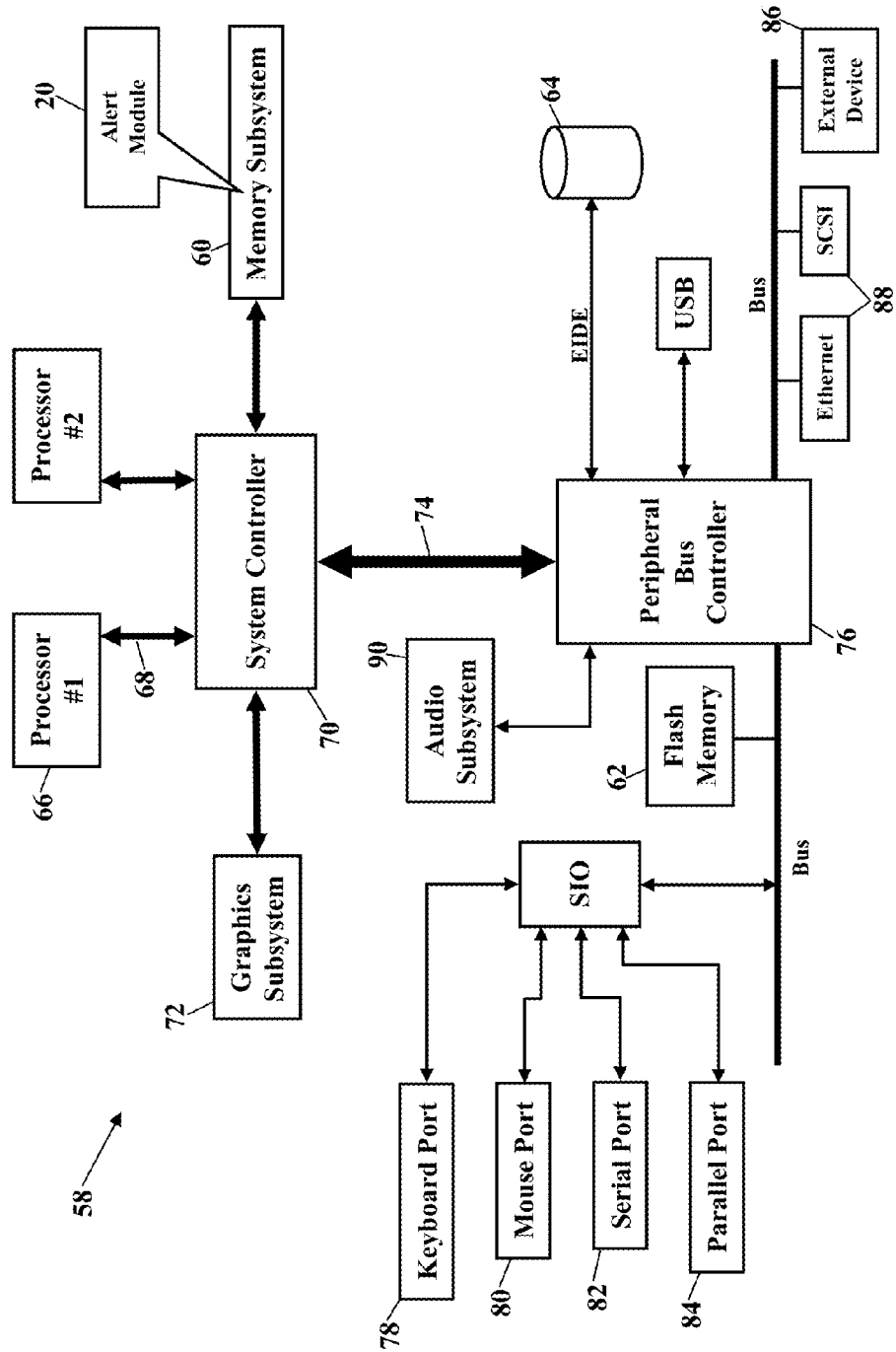
FIG. 8 depicts another operating environment for embodiments of this invention.

FIG. 8 depicts another operating environment for an embodiment of this invention. FIG. 8 is a block diagram showing the alert module 20 residing in a computer system 58 (such as the communications server 22 shown in FIGS. 2-7). The alert module 20 operates within a system memory device. The alert module 20, for example, is shown residing in a memory subsystem 60. The alert module 20, however, could also reside in flash memory 62 or peripheral storage device 64. The computer system 58 also has one or more central processors 66 executing an operating system. The operating system, as is well known, has a set of instructions that control the internal functions of the computer system 58. A system bus 68 communicates signals, such as data signals, control signals, and address signals, between the central processor 66 and a system controller 70 (typically called a "Northbridge"). The system controller 70 provides a bridging function between the one or more central processors 66, a graphics subsystem 72, the memory subsystem 60, and a PCI (Peripheral Controller Interface) bus 74. The PCI bus 74 is controlled by a Peripheral Bus Controller 76. The Peripheral Bus Controller 76 (typically called a "Southbridge") is an integrated circuit that serves as an input/output hub for various peripheral ports. These peripheral ports could include, for example, a keyboard port 78, a mouse port 80, a serial port 82 and/or a parallel port 84 for a video display unit, one or more external device ports 86, and networking ports 88 (such as SCSI or Ethernet). The Peripheral Bus Controller 76 could also include an audio subsystem 90. Those of ordinary skill in the art understand that the program, processes, methods, and systems described in this patent are not limited to any particular computer system or computer hardware.

The central processor 66 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is WINDOWS® (WINDOWS® is a registered trademark of Microsoft Corporation, One Microsoft Way, Redmond Wash. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 60, flash memory 62, or peripheral storage device 64) may also contain an application program. The application program cooperates with the operating system and with a video display unit (via the serial port 82 and/or the parallel port 84) to provide a Graphical User Interface (GUI). The Graphical User Interface typically includes a combination of signals communicated along the keyboard port 78 and the mouse port 80. The Graphical User Interface provides a convenient visual and/or audible interface with a user of the computer system 58.

Figure 9:
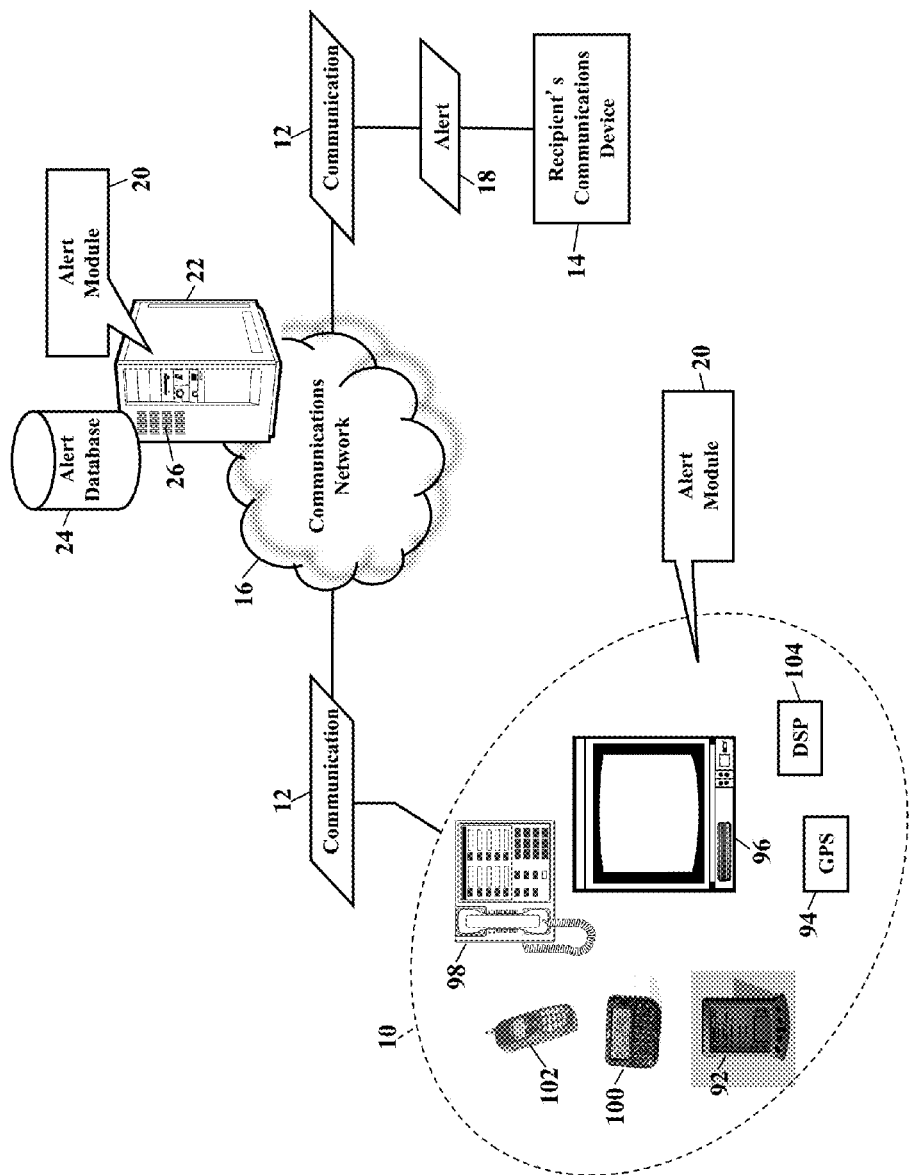
FIGS. 9 and 10 are schematics illustrating still more networks according to embodiments of this invention operating within various communications devices.
Figure 10:
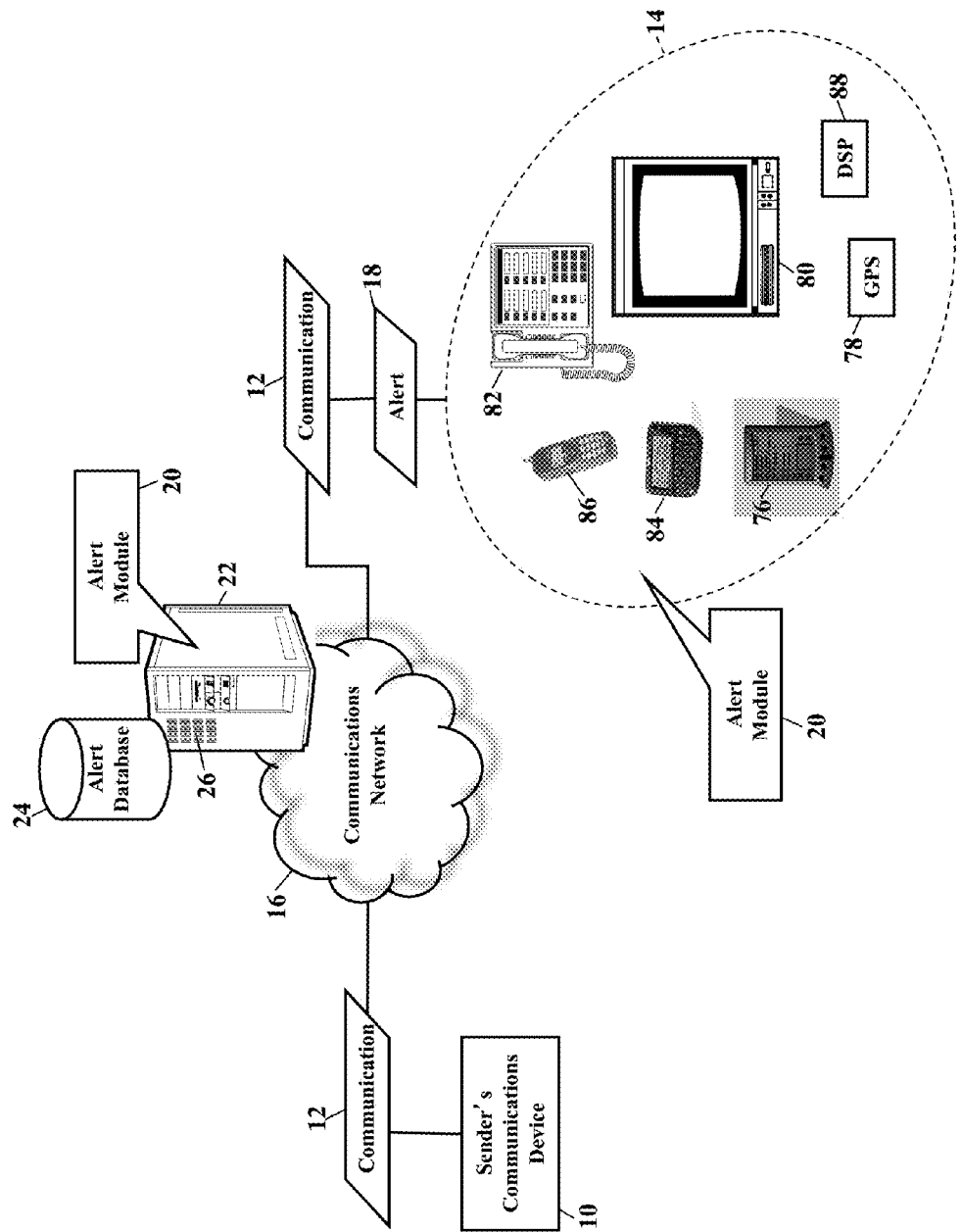

FIGS. 9 and 10 are schematics illustrating still more embodiments of this invention. FIGS. 9 and 10 illustrate that the alert module 20 may alternatively or additionally operate within various communications devices. FIG. 9, for example, illustrates that the alert module 20 may entirely or partially operate within various calling party communications devices 10. FIG. 10 illustrates that the alert module 20 may also entirely or partially operate within various called party communications devices 14. As FIG. 9 shows, the alert module 20 may operate in a personal digital assistant (PDA) 92, a Global Positioning System (GPS) device 94, an interactive television 96, an Internet Protocol (IP) phone 98, a pager 100, a cellular/satellite phone 102, or any computer system and/or communications device utilizing a digital signal processor (DSP) 104. FIG. 10, likewise, illustrates that the called party communications devices 14 may include the personal digital assistant (PDA) 92, the Global Positioning System (GPS) device 94, the interactive television 96, the Internet Protocol (IP) phone 98, the pager 100, the cellular/satellite phone 102, or any computer and/or communications device utilizing the digital signal processor (DSP) 104. The calling party's communications device 10, and/or the called party's communications device 14, may also include watches, radios, vehicle electronics, clocks, printers, gateways, and other apparatuses and systems.

Figure 11:
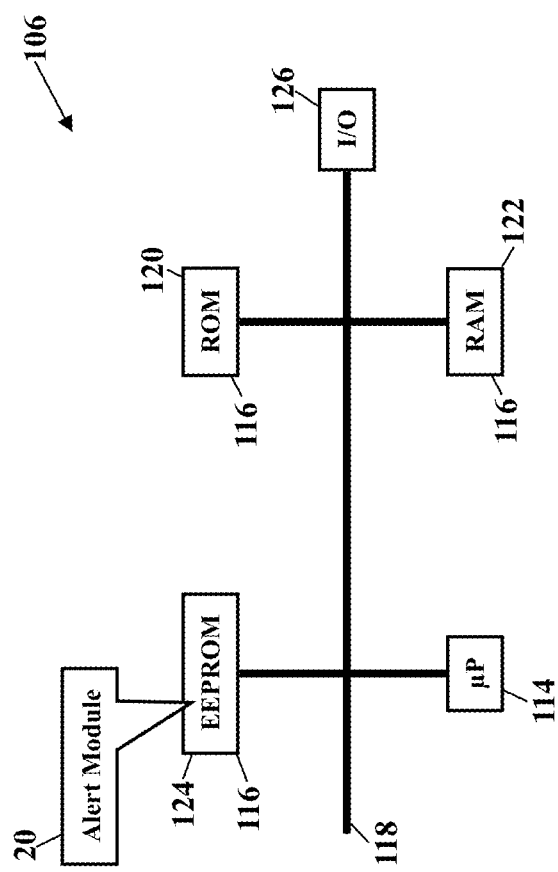
FIGS. 11-13 are schematics further illustrating various communications devices for playing alerts according to embodiments of this invention.
Figure 13:
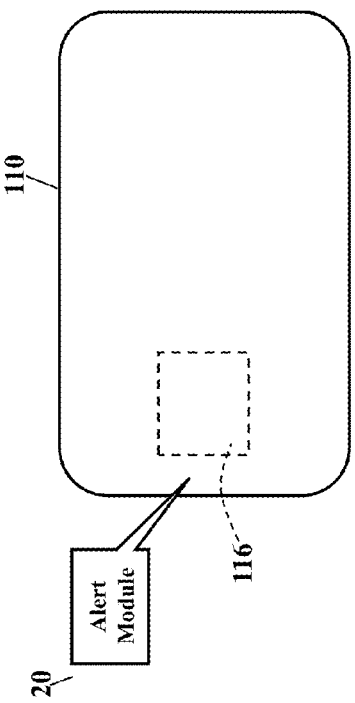
Figure 12:
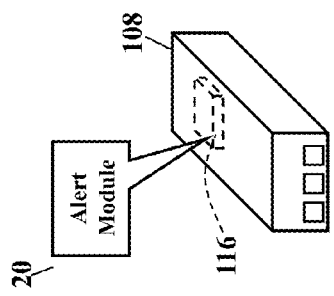

FIGS. 11-13 are schematics further illustrating various communications devices for playing alerts according to embodiments of the invention. FIG. 11 is a block diagram of a Subscriber Identity Module 106, while FIGS. 12 and 13 illustrate, respectively, the Subscriber Identity Module 106 embodied in a plug 108 and the Subscriber Identity Module 106 embodied in a card 110. As those of ordinary skill in the art recognize, the Subscriber Identity Module 106 is used in conjunction with many communications devices (such as the cellular/satellite phone 102 shown in FIGS. 9 and 10). The Subscriber Identity Module 106 stores user information (such as the user's International Mobile Subscriber Identity, the user's $K_i$ number, and other user information) and any portion of the alert module 20. As those of ordinary skill in the art also recognize, the plug 108 and the card 110 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995 January))." The GSM Standard 11.11 is formally known as "Digital cellular telecommunications system (Phase 2+) (GSM); *Specification of the Subscriber Identity Module—Mobile Equipment (Subscriber Identity Module—ME) interface* (GSM 11.11 V5.3.0 (1996 July))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts*," and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 11 is a block diagram of the Subscriber Identity Module 106, whether embodied as the plug 108 of FIG. 12 or as the card 110 of FIG. 13. Here the Subscriber Identity Module 106 comprises a microprocessor (μP) 114 communicating with memory modules 116 via a data bus 118. The memory modules may include Read Only Memory (ROM) 120, Random Access Memory (RAM) and or flash memory 122, and Electrically Erasable-Programmable Read Only Memory (EEPROM) 124. The Subscriber Identity Module 106 stores some or all of the alert module 20 in one or more of the memory modules 116. FIG. 11 shows the alert module 20 residing in the Erasable-Programmable Read Only Memory 114, yet the alert module 20 could alternatively or additionally reside in the Read Only Memory 120 and/or the Random Access/Flash Memory 122. An Input/Output module 126 handles communication between the Subscriber Identity Module 106 and the communications device. Because Subscriber Identity Modules are well known in the art, this patent will not further discuss the operation and the physical/memory structure of the Subscriber Identity Module 106. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 14:
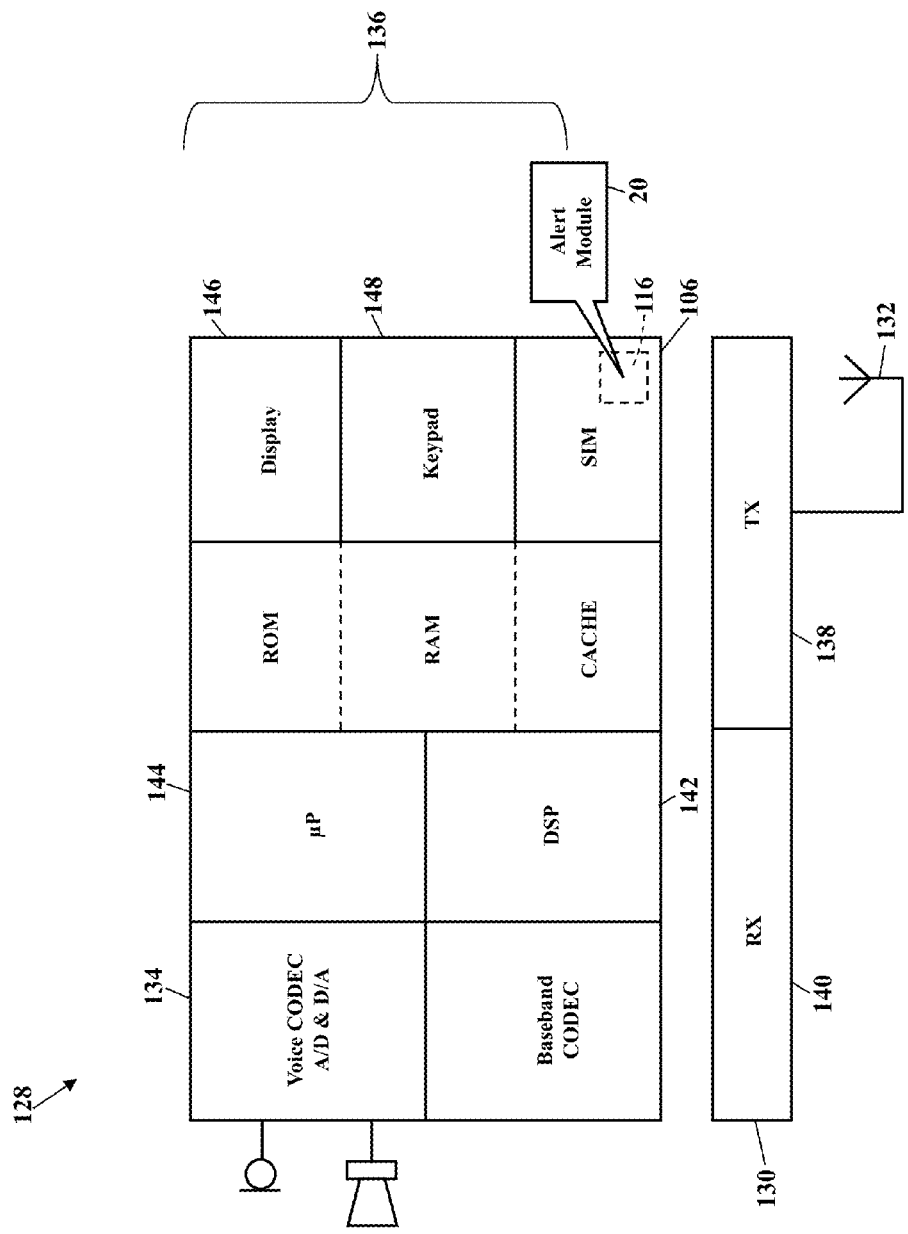
FIG. 14 is a schematic further illustrating various communications devices for playing alerts according to embodiments of this invention.

FIG. 14 is a schematic further illustrating various communications devices for presenting alerts according to embodiments of the invention. FIG. 14 is a block diagram of another communications device 128 utilizing the alert module 20. Here the communications device comprises a radio transceiver unit 130, an antenna 132, a digital baseband chipset 134, and a man/machine interface (MMI) 136. The transceiver unit 130 includes transmitter circuitry 138 and receiver circuitry 140 for receiving and transmitting radio-frequency (RF) signals. The transceiver unit 130 couples to the antenna 132 for converting electrical current to and from electromagnetic waves. The digital baseband chipset 134 contains a digital signal processor (DSP) 142 and performs signal processing functions for audio (voice) signals and RF signals. As FIG. 14 shows, the digital baseband chipset 134 may also include an on-board microprocessor 144 that interacts with the man/machine interface (MMI) 136. The man/machine interface (MMI) 136 may comprise a display device 146, a keypad 148, and the Subscriber Identity Module 106. The on-board microprocessor 144 performs GSM protocol functions and control functions for the radio circuitry 138 and 140, for the display device 146, and for the keypad 148. The on-board microprocessor 144 may also interface with the Subscriber Identity Module 106 and with the alert module 20 residing in the memory module 116 of the Subscriber Identity Module 106. Because the functional architecture of the communications device 128 is well known to those of ordinary skill in the art, the communications device 128 will not be further discussed. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

Systems and methods according to embodiments of the invention may be applied to any signaling standard. As those of ordinary skill in the art recognize, FIGS. 11-13 illustrate a Global System for Mobile (GSM) communications device. That is, the communications device utilizes the Global System for Mobile (GSM) communications signaling standard. Those of ordinary skill in the art, however, also recognize embodiments of the invention are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 15:
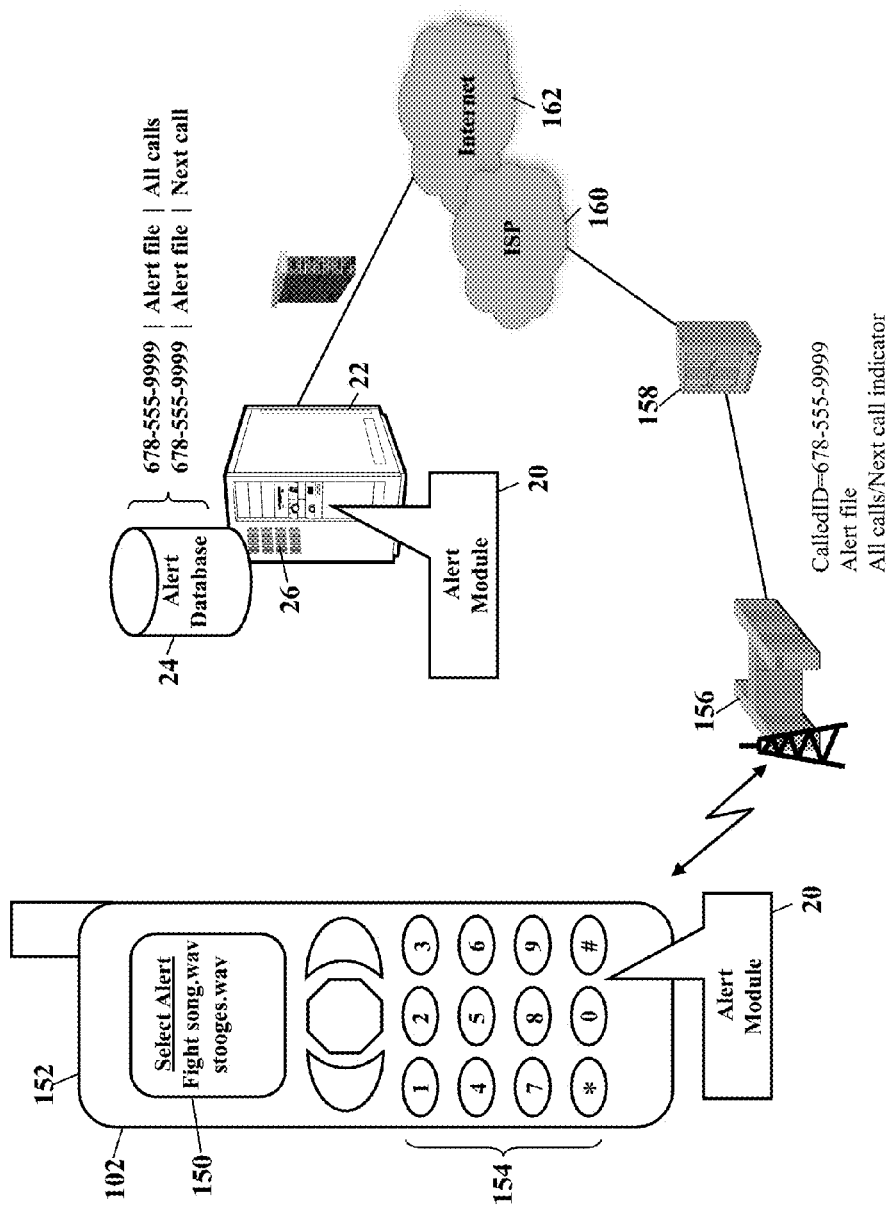
FIGS. 15-17 are schematics further illustrating this alert communications service in a wireless environment.
Figure 16:
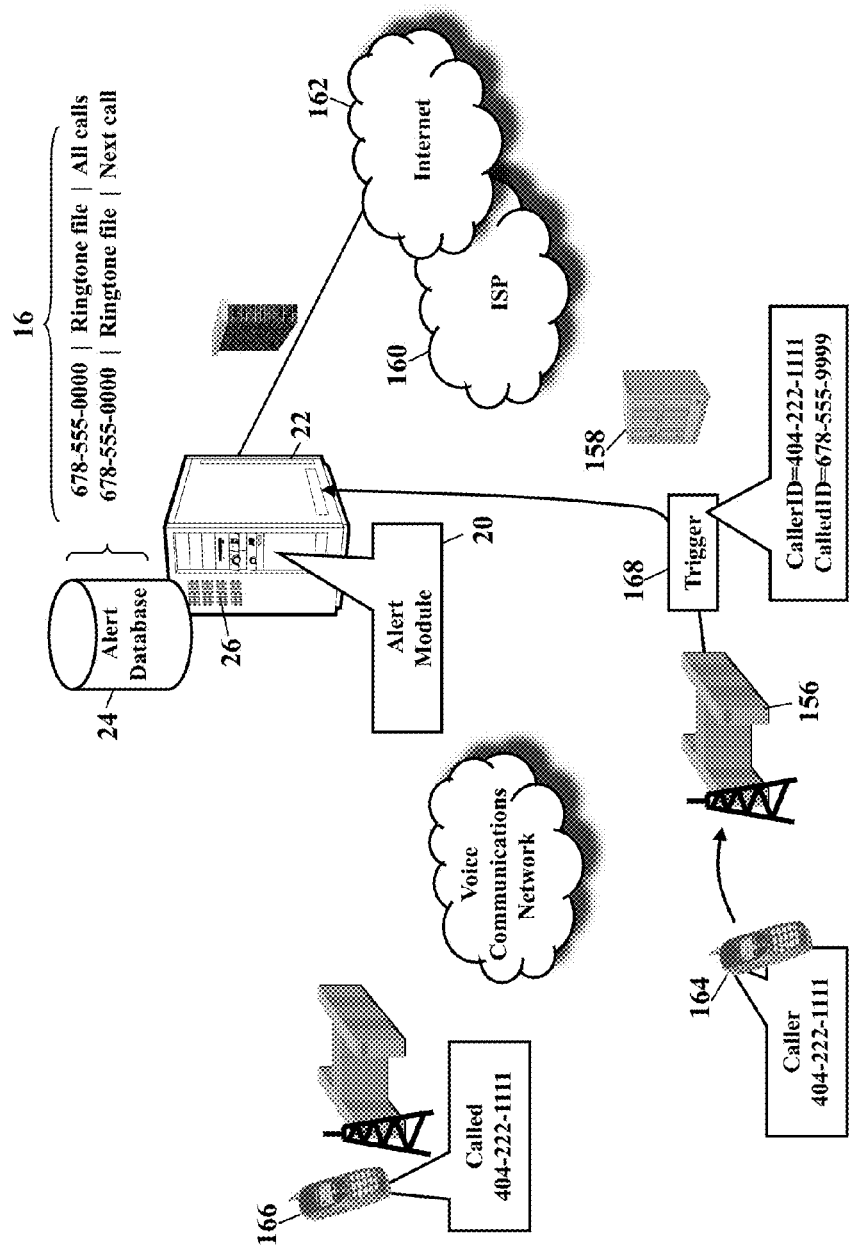
Figure 17:
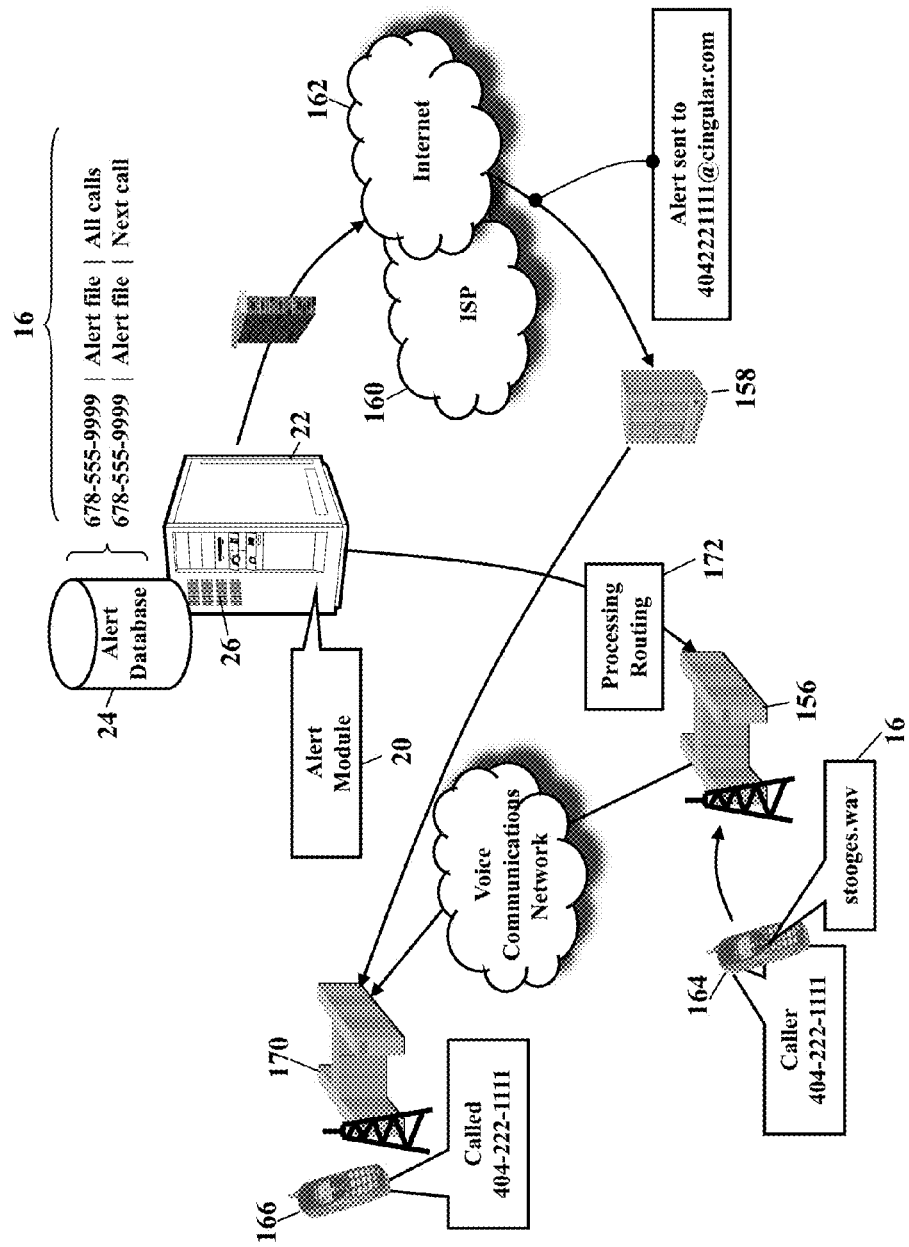

FIGS. 15-17 are schematics further illustrating this alert service. FIG. 15 illustrates a procedure for establishing this alert communications service in a wireless environment. FIG. 16 illustrates placement of a call and retrieval of the alert, while FIG. 17 illustrates "pushing" the alert to the called party. Beginning with FIG. 15, the calling party associates a called party to the desired alert. The calling party, for example, may use a graphical user interface 150 to select the desired alert. FIG. 15 shows a communications device 152, such as the cellular/satellite phone 102, presenting the graphical user interface 150 to the calling party. The graphical user interface provides a selection of alerts to the calling party. The calling party uses a keypad 154 to scroll through the graphical user interface 150 and to select the desired alert. The calling party then associates a called party with the desired alert. The calling party's selections are communicated during a data session communication. The calling party's selections communicate to the alert module 20, and store in the alert database 24, via a mobile switching center 156, via a gateway 158, via an Internet Service Provider (ISP) 160 to the Internet 162, and via the communications server 22. The alert database 24 stores the calling party's alert associations, as previously explained.

FIG. 16 illustrates placement of a call and retrieval of the alert. The calling party 164 places a call to the called party 166. The call routes to the mobile switching center 156 serving the calling party 164 which initiates a trigger 168. The trigger 168 is communicated to the alert module 20 operating in the communications server 22. The trigger 168 includes data representing the calling telephone number and the called telephone number. The alert module 20 queries the alert database 24 for the associated alert 16. The alert database 24 then retrieves the associated alert 16.

FIG. 17 illustrates "pushing" the alert 18 to the called party 166. Once the associated alert 18 is retrieved, that alert 18 is return communicated to the called party 164. As FIG. 17 shows, the alert 18 communicates to a mobile switching center 170 serving the called party 166. The alert 16 communicates via the Internet 162, the Internet Service Provider (ISP) 160, and the gateway 158. The alert 18 ("stooges.wav") is then presented on the called party's communications device 166. As FIG. 17 also shows, the alert module 20 and/or the communications server 22 may also issue processing/routing instructions 172 for the call.

The teachings of this invention may also be applied to an Internet Protocol environment. When the call routes to the mobile switching center 156 serving the calling party 164, the alert module 20, operating in the communications server, analyzes the packets of data. The alert module 20 may analyze a header portion of one or more packets of data and/or the alert module 20 may analyze a payload portion of one or more packets of data. The header portion and/or the payload portion would include data representing the calling telephone number and the called telephone number. The alert module 20 would use this data to query the alert database 24 for the associated alert 18. The alert database 24 then retrieves the associated alert 18, and that alert 18 is return communicated to the called party 166.

FIG. 18 is a flowchart illustrating a method of providing an alert communications service to the calling party. A graphical user interface is stored in memory (Block 174). The graphical user interface may be stored in the memory of a computer (such as the computer server 22), and the graphical user interface is accessed/downloaded via the Internet. The graphical user interface may additionally or alternatively be locally stored in the memory of the communications device 10 or other device. The graphical user interface presents a selection of alerts to the calling party (Block 176). The selection of alerts allows the calling party to specify the alert to be presented on a called party's communications device. The calling party may be allowed to preview an alert (Block 178), thus allowing the calling party to see, hear, feel, and/or otherwise experience the alert before selection. The calling party's selection of an alert is accepted (Block 180), and the calling party is allowed to associate the alert to a communications address of the called party (Block 182). The selected alert is processed (Block 184). The calling party may thus specify the alert to be presented on the called party's communications device.

The terms "processed," "process," "processing," and variants, as used herein, encompass any event from the time the calling party's communications device initiates a communication to the termination of the communication. The terms "processed," "process," "processing," and variants include storing the alert in memory, routing a voice path, signaling setup, and intelligence queries (e.g., Local Number Portability queries, queries to retrieve Calling/Called Name/Number information, AIN queries, and standard signaling messages to determine call routing paths). The terms "processed," "process," "processing," and variants also include monitoring an established telephone call for possible DTMF entry, switch hook flash, other events that indicate a party on the telephone call has requested something, and delivery of call waiting tones and data. The terms "processed," "process," "processing," and variants also include identification of packets, of packet headers, and of the payload contents of packets. The terms "processed," "process," "processing," and variants include deciphering the header and/or payload contents of a packet and acting on those contents. The terms "processed," "process," "processing," and variants also include storing alert selections in memory, retrieving those alert selections, and/or communicating those alert selections to a called party and/or to another network device. The terms "processed," "process," "processing," and variants, however, also encompass billing activities and measurements at a switch or any other network element.

Censorship is also permissible. The calling party to this service can specify the alert to be presented on the called party's communications device. The called party, however, may choose to block or censor the calling party's selected alert. The called party may not approve of certain content for the alert. The called party may dislike some alerts. The called party, for example, may disapprove of lyrics, scenes, or other content in the alert. This method would also provide the called party an opportunity to block or censor the calling party's selected alert. The called party may maintain a profile in the alert database 24. When the calling party's alert is retrieved, the alert module 20 could cross-reference the calling party's alert to the called party's list of approved/censored/block alerts. If a match is found, the alert module 20 would approve/decline the selected alert. The called party's profile may specify a default alert to be presented to the called party, in the event the calling party's selected alert is censored/blocked. The called party's profile may even demand a mandatory alert to be presented to the called party, regardless of the calling party's selected alert.

Network selection of the alert is also possible. The calling party might provide a list of approved alerts. The list could include any content, such as music, movies, pictures, streaming audio/video, or other content. The calling party could then let the alert module 20 select the alert on behalf of the calling party. That is, when the called party receives a communication (such as an email or a telephone call), the called party would experience an alert selected from the list. The alert module 20 could use any method of selecting an alert from the list. The alert module 20, for example, could randomly select from the list, or the alert module 20 could sequentially work through the list with each successive communication. However the alert is selected, the alert module 20 selects the alert on behalf of the calling party.

Embodiments of the invention may also be applied to a shared communications device. Many families, for example, share a single communications device (e.g., computer, mobile phone, PDA). Because the communications device is shared amongst multiple users, the configuration parameters of the communications device can be switched to suit each user. The alerts, likewise, may be personalized according to the profile of the user. Each sharing user could maintain a unique profile (such as the profile 34 in FIG. 4) of associated alerts. When a user's profile is activated or configured, that user's alert associations are also activated. The alert module 20 may even use the called party's telephone number to automatically select the appropriate profile and, thus, alert. When the called party's telephone number, for example, is known to be a child's friend, the alert module 20 could automatically select that child's profile and the associated alert. When the called party's telephone number is a friend of dad's, the alert module 20 could automatically select dad's profile and the associated alert. If the called party's telephone number is a business, the alert module 20 could default to a subdued alert. The alert module 20, then, could be programmed to recognize certain called telephone numbers and to automatically switch to an associated profile and alert.

The alert module (shown as reference numeral 20 in FIGS. 2-17) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the alert module to be easily disseminated. A computer program product for providing alerts to a called party comprises the computer-readable medium and the alert module. The alert module is stored on the computer-readable medium and includes computer code/instructions. The alert module provides a selection of alerts to a calling party, and the alert module accepts the calling party's selection of an alert. The alert presents to a called party to announce an incoming communication.

The alert module may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

The invention claimed is:

1. A method, comprising:
    processing, by a server, a request for a call from a network address to another network address;
    retrieving, by the server, a name of a sports team associated with the another network address;
    retrieving, by the server, a filename associated with the name of the sports team;
    sending, by the server, the request for the call to the another network address; and
    sending, by the server, the filename to accompany the request for the call, the filename associated with a file presented during a wait time as an alert of the call.

2. The method of claim 1, further comprising querying for a score associated with the name of the sports team.

3. The method of claim 2, further comprising sending the score to the another network address.

4. The method of claim 2, further comprising sending the score to accompany the request for the call.

5. The method of claim 1, further comprising querying for the name of the sports team.

6. The method of claim 1, further comprising storing a database that associates different names of sports teams to different network addresses.

7. The method of claim 1, further comprising storing a database that associates different filenames to different network addresses.

8. A system, comprising:
    a processor; and
    a memory device, the memory device storing code, the code when executed causing the processor to perform operations, the operations comprising:
    processing a request for a call from a network address to another network address;
    retrieving a name of a sports team associated with the another network address;
    retrieving a filename associated with the name of the sports team;

sending the request for the call to the another network address; and sending the filename to accompany the request for the call, the filename for presentation during a wait time as an alert of the call.

9. The system of claim 8, wherein the operations further comprise querying for a score associated with the name of the sports team.

10. The system of claim 9, wherein the operations further comprise sending the score to the another network address.

11. The system of claim 9, wherein the operations further comprise sending the score to accompany the request for the call.

12. The system of claim 8, wherein the operations further comprise querying for the name of the sports team.

13. The system of claim 8, wherein the operations further comprise storing a database that associates different names of sports teams to different network addresses.

14. The system of claim 8, wherein the operations further comprise storing a database that associates different filenames to different network addresses.

15. A memory device storing instructions that when executed cause a processor to perform operations, the operations comprising:

processing a request for a call from a network address to another network address;

retrieving a name of a sports team associated with the another network address;

retrieving a filename associated with the name of the sports team;

sending the request for the call to the another network address; and sending the filename to accompany the request for the call, the filename for presentation during a wait time as an alert of the call.

16. The memory device of claim 15, wherein the operations further comprise querying for a score associated with the name of the sports team.

17. The memory device of claim 16, wherein the operations further comprise sending the score to the another network address.

18. The memory device of claim 16, wherein the operations further comprise sending the score to accompany the request for the call.

19. The memory device of claim 15, wherein the operations further comprise querying for the name of the sports team.

20. The memory device of claim 15, wherein the operations further comprise storing a database that associates different names of sports teams to different network addresses.

* * * * *